May 12, 1931. D. I. REITER 1,804,951

SNAP FASTENER

Filed July 16, 1930

INVENTOR:
Daniel I. Reiter.

By Attorneys,
Fraser, Myers & Manley.

Patented May 12, 1931

1,804,951

UNITED STATES PATENT OFFICE

DANIEL I. REITER, OF NEW YORK, N. Y.

SNAP FASTENER

Application filed July 16, 1930. Serial No. 468,287.

This invention relates to an improved snap fastener of the type comprising a stud and a socket, parts of which are so correlated as to resist separation when subjected to a direct pull, or when an attempt is made to pull them apart after the stud has been tilted with respect to the socket in any direction except one.

When the stud is tilted with respect to the socket in one predetermined direction the parts may be readily separated by the application of sufficient force. The use of the term "direction" in the foregoing brief description is not intended to be interpreted as geometrically precise. The fastener may be separated when tilted in any direction which might fall within an arc of several degrees approximating perhaps as much as 90°, but may not be separated when tilted in any other direction falling within an arc of approximately 270°. Stated in other words, the stud may be separated from the socket when tilted in one general direction with respect thereto, but may not be separated when tilted generally in the opposite direction or in a direction at right angles thereto.

It is an object of the invention to provide a fastener of the above-described character, of which the stud has an outer, inwardly-facing, abrupt, annular shoulder, and an inner, outwardly-facing, flared, annular shoulder, and of which the socket has a flexible stud-retaining element comprising expansible arms having substantially flat surfaces so disposed as to be engaged by the abrupt shoulder on the stud and prevent its withdrawal when tilted in any direction except the direction in which it is intended that it shall be released.

It is a further object of the invention to provide the expansible arms of the stud-retaining element with flaring surfaces so positioned as to cause the arms of the stud-retaining element to be readily separated by the flaring shoulder on the stud when tilted in the direction which does not bring the abrupt shoulder of the stud in contact with a flat surface of the holding element, thereby facilitating the separation of the stud from the socket.

In the accompanying drawings illustrating the preferred and modified forms of the invention—

Fig. 6 is a cross-sectional view through one of the retaining arms of the stud-holding element illustrated in Fig. 5, the plane of cross-section being indicated by the line 6—6.

Fig. 8 is a portion of the sectional view illustrated in Fig. 7 drawn to a larger scale, the parts being represented with the axis of the stud perpendicular to the bounding planes of the socket.

Fig. 12 is a view of the stud-retaining element, the arms being indicated as having been separated by the tilting of the stud in the direction indicated in Fig. 10.

As indicated in Figs. 1 to 7, inclusive, the invention may comprise a stud 20 and a socket 21 in which the stud may be inserted, held, and detached when desired.

Figure 1:
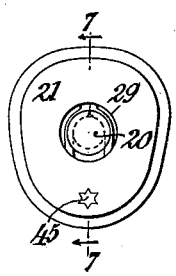
Figure 1 is a face view of a fastener having the invention applied thereto.
Figure 2:
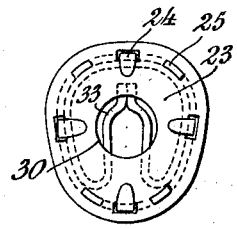
Fig. 2 is a rear view of the socket member of the fastener separated from the stud.
Figure 3:
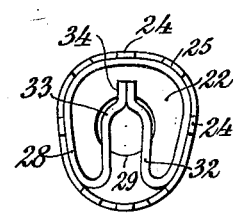
Fig. 3 is a rear view of the socket illustrated in Fig. 2, with the back plate removed in order to more clearly disclose the enclosed stud-retaining element.
Figure 4:
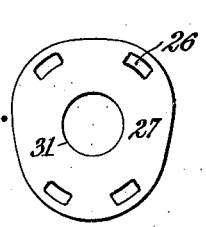
Fig. 4 is a face view of a clamping plate which may be employed when securing the socket to the material of the article on which it is to be used.
Figure 7:
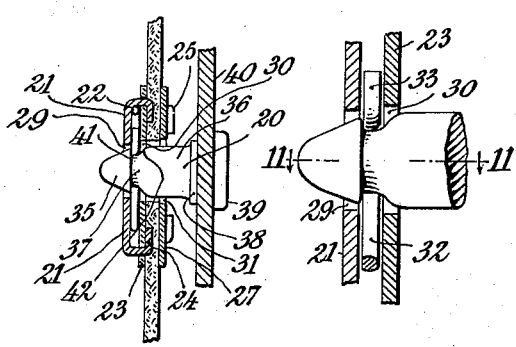
Fig. 7 is a longitudinal sectional view through the fastener cut along the plane represented by the line 7—7 of Fig. 1 and viewed in the direction indicated by the arrows.

The socket may comprise a casing consisting of a flanged front plate 22 (Figs. 3 and 7) and a back plate 23 (Figs. 2 and 7), the face plate 22 having prongs 24 which may be passed through openings in the back plate and clinched against its rear surface, as clearly indicated in Figs. 2 and 7.

The front plate 22 may also be provided with spurs 25 which may extend through openings in the back plate 23 so as to be adapted to pierce the fabric or other material of the article on which the socket is to be used and then flattened or clinched so as to prevent withdrawal. Preferably the prongs 25 after they have been forced through such fabric or other material will be passed through openings 26 in a clamping plate 27 (Figs. 4 and 7) applied to the under surface of such material, and then bent down against the rear surface of the clamping plate so as to firmly secure the material between the clamping plate and the back plate of the socket.

Between the walls 22 and 23 of the socket may be mounted the stud-holding element 28 (Fig. 3), which may comprise a flexible wire or bar bent into the form of a loop of substantially the same shape as the inner chamber of the casing, whereby relative movement between the body of the loop and the casing may be prevented. The walls 22, 23 of the fastener, as well as the wall 27, when used, may all be perforated as at 29, 30, 31, to permit the stud to be thrust endwise through the walls of the socket to the position indicated in Fig. 7, and the loop of the stud-retaining element 28 may have its ends bent inwardly to provide a pair of substantially parallel arms 32 lying just within the opposite margins of the opening 29. The arms 32 may have curved end portions 33 substantially concentric with and lying just within a portion of the margin of the opening 29, and these curved portions may terminate with a pair of parallel contacting, but separable, portions 34.

The stud-retaining element 28 may be of such normal form as to produce any desired amount of tension in the arms 32 when inserted in the casing, thus causing the terminal portions 34 to be held in close contact and affording the desired resistance to the spreading or expansion of the arms when the stud is inserted.

A stud adapted for use as a part of the invention, as clearly illustrated in Fig. 7, may comprise a head 35, a shank 36, a neck 37 connecting the head with the shank, and any appropriate means 38, 39 by which the stud may be secured to an article 40 on which it is to be used.

The forms of the portions of the head and shank adjacent the neck 37 are such as to provide an outer, inwardly-facing, abrupt, annular shoulder 41 at the under side of the head, and an inner, outwardly-facing, flaring, annular shoulder 42 where the shank rounds into the neck.

It will be apparent that, when the stud 20 is thrust through the openings 31, 30, 29 of the socket to the position indicated in Fig. 7, the arms 32 of the stud-retaining element will first be expanded by the head 35 of the stud and then permitted to snap together and embrace the neck 37. When in this position the abrupt annular shoulder 41 of the head will rest directly against opposed parallel portions of the arms 32 as well as against the curved portions 33 of said arms, thus preventing a separation of the stud from the socket as a result of a direct pull. The stud may, however, be separated from the socket if first tilted to the position indicated in Fig. 9 so as to cause the flaring shoulder 42 to engage and crowd apart the rounded end portions 33 of the stud-retaining arms while at the same time causing the abrupt shoulder 41 of the head to be crowded down between the parallel portions 32 of the arms.

Figure 9:
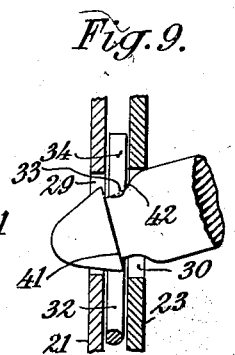
Fig. 9 is a fragmentary sectional view corresponding with that shown in Fig. 8, the stud being indicated as having been tilted with respect to the socket in the direction which makes it possible to separate the parts of the fastener.

In order to facilitate the separation of the stud from the socket in this manner, it is important that the under surfaces of the curved portions 33 of the stud-retaining arms be curved or flared in such manner as to cooperate with the flared surface 42 of the spreader on the stud and insure the spreading of the arms when the stud is tilted to the position indicated in Fig. 9.

In order that the stud may be tilted in the above-described manner as a means of separating it from the socket, the holes 29, 30 and 31 of the socket, if of equal diameter, would have to be appreciably larger than the diameter of the stud. The size of the hole 29, however, may be made more nearly equal to that of the stud if one or both of the holes 30, 31 are made of a somewhat larger diameter. Preferably the hole 29 will be made of a diameter such as to merely afford a reasonable clearance around the head of the stud when inserted, and the holes 30 and 31 will be of a sufficiently larger diameter to permit the desired amount of tilting to effect a separation. In the preferred form the hole 30 would be of larger diameter than the hole 29, but of somewhat smaller diameter than the hole 31.

It will be apparent that if all three holes 29, 30 and 31 were concentric they would permit the stud to be tilted with respect to the socket to the same angle of inclination irrespective of the direction of tilting. It is an important feature of the invention to insure the retention of the stud in the socket by the stud-retaining means when the stud is thus tilted in any direction other than the one in which it is intended that the parts may be separated. This has been accomplished by making the outer surface of the stud-retaining element 28, or at least the outer surface of so much of that element as comprises the parts of the arms 32, 33, 34 which come in direct contact with the abrupt shoulder 41 of the stud, of a substantially flat form. Preferably this may be done by making either the entire fastener or the above-mentioned portions of the arms of a half-round form in cross-section, as clearly illustrated in Fig. 6. When so constructed the flat surface 43 is so positioned as to engage the abrupt shoulder 41 of the inserted stud, and the curved surface 44 is so positioned as to be engaged by the spreader 42 on the stud when tilted in the proper direction to separate the parts of the fastener.

Figure 13:
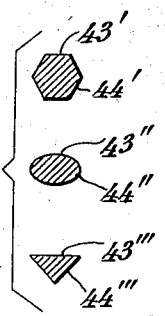
Fig. 13 illustrates three alternative cross-sectional forms of the stud-retaining element.

In Fig. 13 are illustrated alternative cross-sectional forms in which the arms of the stud-retaining element may be made. Each of these forms would comprise substantially flat stud-retaining surfaces 43′, 43″, 43‴, and flared or curved surfaces 44′, 44″, 44‴, to be engaged by the spreader when separating the stud from the socket.

Figure 10:
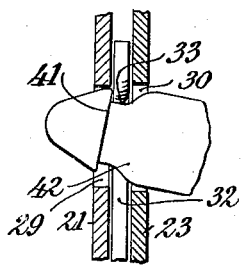
Fig. 10 is a sectional view similar to that illustrated by Fig. 8, the stud being indicated as having been tilted in a direction opposite to the direction of tilting indicated in Fig. 9.
Figure 11:
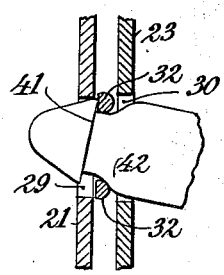
Fig. 11 is a cross-sectional view through the parts of the fastener illustrated in Fig. 8, the plane of section being indicated by the line 11—11, and the stud being represented as having been tilted with respect to the socket in a direction at right angles to the direction of tilting indicated in Figs. 9 and 10.

When the stud of a fastener having a stud-retaining element of the above-described character is tilted in the direction indicated in Fig. 10, the spreader 42 may engage and slightly expand the arms 32 of the retaining element, but the abrupt shoulder 41 of the stud will be thrust over the flat surfaces of the bent portions 33 (Fig. 3) of the retaining element, which will positively prevent the stud from being withdrawn from the socket.

Should the stud be tilted in a direction at right angles to that of the tilting indicated in Figs. 9 and 10, the spreader 42 may engage one of the arms 32 of the stud-retaining element and move the same slightly to one side, but the abrupt shoulder 41 of the head will at the same time be brought into an engaging relation with the flat surface of the other arm 32 and thereby positively prevent the withdrawal of the stud from the socket.

It will be obvious from the foregoing description that the only manner in which the stud may be separated from the socket is to tilt it in the general direction indicated in Fig. 9, so that the spreader 42 will engage the flaring surfaces of the curved portions 33 of the stud-retaining element and cause them to be separated at the same time at which the abrupt shoulder 41 is thrust downwardly between the arms 32 of the retaining element where there is no opposing surface to obstruct its movement. Under such circumstances a pull on the stud will cause the head to wedge its way further into the space between the arms 32 and expand them to a sufficient extent to permit the parts of the fastener to be separated.

Figure 5:
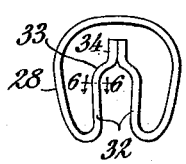
Fig. 5 is a face view of the stud-retaining element of the socket removed from its casing.

In Fig. 5 the stud-retaining element is indicated as being constructed of a wire, all portions of which are of uniform shape in cross-section, such shape being either that represented in Fig. 6 or that of one of the three modified forms illustrated in Fig. 13.

In Fig. 12 the fastener element is illustrated as one of which only the portions 34′, 33′ and the portions of the arms 32 closely adjacent the portions 33′ are of one of the special cross-sectional forms illustrated in Figs. 6 and 13. The remainder of the retaining element may be of ordinary round wire or a bar of any desired form in cross-section.

If desired, a star or other appropriate designating mark 45 may be placed upon the socket as a basis for reference in giving instructions as to the relative direction of tilting of the socket with respect to the stud when it is desired to separate them.

The invention is not intended to be limited to the specific forms herein disclosed for purposes of illustration, but should be regarded as including modifications and variations thereof within the scope of the appended claims.

What is claimed is:

1. A snap fastener comprising a casing having an aperture therein through which a stud may be passed, a flexible stud-retaining element in said casing having a pair of expansible arms lying just within the margin of said aperture and a stud having an abrupt, outer, inwardly-facing, annular shoulder and a flaring, inner, outwardly-facing, annular shoulder to serve as a spreader, the arms of the stud-retaining element having relatively flat surfaces on the sides which engage the abrupt shoulder of said stud when inserted and flaring surfaces to be engaged by said spreader.

2. A snap fastener socket comprising a casing having an aperture to receive a stud, and a flexible stud-retaining element consisting of a bent half-round wire having stud-engaging arms just within the marginal portion of said aperture, the flat surfaces of said arms being so positioned as to serve as a holding means for an abrupt shoulder on an inserted stud and their oppositely-positioned rounded surfaces being adapted for cooperation with a spreader on the stud.

3. A snap fastener comprising a circular stud having an outer, inwardly-directed, abrupt, annular shoulder and an inner, outwardly-directed, flaring, annular spreader, in combination with a socket comprising a casing having an aperture therein to receive said stud, and a stud-holding element therein having a pair of substantially parallel flexible arms lying just within opposite marginal portions of said aperture with portions of their free ends substantially concentric with and lying just within a portion of the margin of said aperture, the surfaces of said arms which engage the abrupt shoulder of said stud when inserted being relatively flat and their surfaces which face the spreader of the inserted stud being flared.

4. A stud-retaining element for a snap fastener socket, said element comprising a flexible loop of wire of half-round form in cross-section having spaced inwardly-directed expansible parallel arms curved towards each other and terminating in contacting end portions, the flat surface of said wire being parallel with the plane of the loop so as to be adapted to engage a stop element on an inserted stud and resist its withdrawal.

5. A stud-retaining element for a snap fastener socket, said element comprising a flexible loop of wire having spaced inwardly-directed expansible parallel arms curved towards each other and terminating in contacting end portions, the portions of said element which serve as said arms having substantially flat surfaces on one side in planes substantially parallel with the plane of the loop, so as to be adapted to engage a stop element on an inserted stud and resist its withdrawal, and flared surfaces on their opposite faces near their mutual points of contact adapted to be readily separated by a spreader element on said stud.

6. A snap fastener comprising a casing having front and back walls, concentric circular openings in said walls, a stud of circular form in cross-section to be thrust through the opening in the back wall and caused to extend into the opening in the front wall, an abrupt, inwardly-directed, outer, annular shoulder and a flared, outwardly-directed, inner, annular shoulder on said stud, and a flexible stud-holding element comprising a pair of spaced expansible arms mounted between the walls of said casing, said openings in said walls being concentric and of different diameters, the one in the front wall being of a diameter slightly greater than that of the stud and slightly less than that of the one in the back wall whereby the stud may be tilted equally in any direction, and the arms of the stud-holding element having curved end portions provided with substantially flat surface portions so disposed as to cooperate with the abrupt shoulder of the inserted stud when tilted in any direction except one and prevent withdrawal, said stud-holding arms having separable end portions provided with flared surfaces so as to be adapted to be spread by the flared shoulder on said stud and permit the stud to be withdrawn when tilted in the one direction which does not bring its abrupt shoulder in engagement with a flat holding portion of the holding element.

In witness whereof, I have hereunto signed my name.

DANIEL I. REITER.